(12) United States Patent
Hofele et al.

(10) Patent No.: US 6,382,400 B1
(45) Date of Patent: *May 7, 2002

(54) TRANSPORT AND POSITIONING SYSTEM

(75) Inventors: Hans Hofele, Göppingen; Andreas Dangelmayr, Ottenbach; Jürgen Eltze, Göppingen; Karl Thudium, Wäschenbeuren, all of (DE)

(73) Assignee: Schuler Pessen GmbH & Co., Goeppingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,256

(22) Filed: Nov. 10, 1999

(30) Foreign Application Priority Data

Nov. 10, 1998 (DE) .......................... 198 51 744

(51) Int. Cl.⁷ .............................................. B65G 25/04
(52) U.S. Cl. ................................ 198/750.1; 198/750.11; 198/750.12; 198/468.01
(58) Field of Search ........................... 198/750.1, 750.11, 198/750.12, 468.2, 468.4, 689.1, 468.6, 750.14; 414/225.01, 752.01, 749.1

(56) References Cited

U.S. PATENT DOCUMENTS

| 3,991,885 | A | * | 11/1976 | Warren | 214/1 BV |
|---|---|---|---|---|---|
| 4,490,091 | A | * | 12/1984 | Brems | 414/749 |
| 4,496,280 | A | * | 1/1985 | Brems | 414/749 |
| 4,806,070 | A | * | 2/1989 | Poux et al. | 414/752 |
| 4,807,456 | A | * | 2/1989 | Shiraishi et al. | 72/405 |
| 5,174,709 | A | * | 12/1992 | Blatt et al. | 414/567 |
| 5,215,181 | A | * | 6/1993 | Blatt | 198/468.2 |
| 5,337,594 | A | * | 8/1994 | Pettersson et al. | 72/446 |
| 5,359,875 | A | * | 11/1994 | Sova | 72/336 |
| 5,363,683 | A | * | 11/1994 | Thudium et al. | 72/405 |
| 5,598,733 | A | * | 2/1997 | Sova | 72/336 |
| 5,829,300 | A | * | 11/1998 | Sova | 72/336 |
| 5,967,291 | A | * | 10/1999 | Hansen | 198/409 |
| 5,992,207 | A | * | 11/1999 | Hofele et al. | 72/405.01 |
| 5,993,143 | A | * | 11/1999 | Eltze et al. | 414/752 |

* cited by examiner

Primary Examiner—Christopher P. Ellis
Assistant Examiner—Rashmi Sharma
(74) Attorney, Agent, or Firm—Crowell & Moring LLP

(57) ABSTRACT

A transport and position system, particularly for the workpiece transfer, has a lever mechanism between its driving motors and its output to carry out a step-up. The lever mechanism takes over the guiding as well as the driving of the carrier device which therefore forms the output of the lever mechanism. As a result of the step-up, high accelerations and decelerations can be achieved at the carrier device. Thereby, the mass inertia of linear guides for the bearing of levers and mass inertias of drives moved along play a substantially reduced role. While a high positioning precision can be achieved.

25 Claims, 8 Drawing Sheets

TRANSPORT AND POSITIONING SYSTEM

BACKGROUND OF THE INVENTION

This application claims priority of DE 198 51 744.0, filed Nov. 10, 1998, the disclosure of which is expressly incorporated by reference herein.

The present invention relates to a transport and/or positioning system, particularly for the workpiece transfer, particularly for transporting sheet metal pieces in the case of transfer presses.

Machining systems having several machining stations arranged in series require a workpiece transport from one working station to another. For this purpose, transfer systems are used which receive the corresponding workpiece, such as a sheet metal piece, in a machining station; guide it out of the latter; place it in the next machining station; and release the workpiece there, in order to remain in a parked position spaced away from the machining station during the machining of the workpiece.

Particularly in the case of large-piece presses, in which large-surface body parts of motor vehicles, in individual cases, entire side pieces of vehicle bodies, are machined, the pieces are several meters wide. Correspondingly, the distance between individual machining stations is relatively large. In this situation, the sheet metal pieces have a considerable weight. In order to permit a high stroke rate of the transfer press, these pieces must be transported relatively rapidly. That is, they must be accelerated and braked again from one working station to another in a relatively speedy manner, in which the transfer system must generate the driving power at the workpiece required for this purpose and must simultaneously ensure a high positioning precision.

Transfer systems, which are to carry out the workpiece transport, for example, between press stations, are also subjected to relatively narrow constructive marginal conditions. It is, for example, desirable for the space laterally next to the press sliding tables to remain free so that the sliding tables can be moved unhindered by the transfer system laterally out of the transfer press.

SUMMARY OF THE INVENTION

An object of the present invention is, therefore, to provide a transport and/or positioning system which permits the bridging of relatively long transport paths in a short time and a precise positioning of the transported pieces.

This object has been achieved by a transport and/or positioning system, a drive device which has at least one lever mechanism with an output for driving and positioning a carrier device, the lever mechanism including a swivel arm whose one end forms the output and is connected with the carrier device and which is connected at two mutually spaced connection points with a bearing and with a drive, the distance between the bearing point and the driving point being smaller than the distance between the output and the bearing point.

The transport and/or positioning system has a lever mechanism with a swivel arm which carries a carrier device on one end. The carrier device can be engaged with the workpiece or can receive the workpiece in a different manner. The swivel arm is situated in the power transmission path which extends from a drive source to the carrier device. In this case, the swivel arms carries out a step-up. It is guided and driven at two points spaced away from the carrier device, the distance between these two points being smaller than the distance of the carrier device from the swivelling axis of the lever. This therefore results in a lever transmission. This lever transmission has the result that the carrier device carries out a faster and more extensive movement than drive devices applied to the swivel arm.

These drive devices may include guides, such as linear guides, slide blocks and similar devices. Because these reach a lower maximal speed and cover shorter paths than the carrier device, their mass is not as important for the dynamics of the drive as the mass of the carrier device. They may be designed such that they result in a precise guidance. A high positioning precision can therefore be reached at the carrier device. As a result of the lever transmission at the swivel arm, it therefore becomes possible to rapidly travel long transport paths with a good precision.

In a currently preferred embodiment, two mutually mirror-symmetrical drive devices have swivel arms connected with one another by means of a traverse which forms the carrier device. The traverse may, for example, be provided with suction spiders or other devices for temporarily carrying workpieces. The cross traverse is guided by the two swivel arms preferably on a loop-shaped path which forms the transfer curve and which extends, for example, in a vertical plane. As a result, with respect to the function, a two-axis transfer is provided in the case of which the cross traverse is moved vertically and horizontally. The path or the transfer curve is not fixedly defined but is preferably selectable or adjustable in that drives pertaining to the drive unit are correspondingly controlled. This is preferably carried out by a programmable control device. If the drive devices applied to the two ends of the traverse are controlled in a different manner, the traverse can also carry out swivelling movements about a vertical axis or an axis situated longitudinally with respect to the transport direction.

The carrier device, such as the traverse, can be provided with a device in order to hold the traverse non-rotated or rotate (tilt) it in a targeted manner when travelling through the transfer curve. This can take place by way of separate drives carried by the swivel arms as well as by way of power transmitting devices, ranging from parallelogram linkages or pulling device transmissions to drives arranged in different manners.

The swivel arm can be swivelled about an axis of rotation which is not stationarily arranged but can be adjusted along a defined path. The swivelling axis can be defined, for example, by a suitable bearing on a slide block, the slide block being disposed on a guide. The slide block guide can be oriented vertically, as required, also horizontally or otherwise, and can be straight or bent. Alternatively, the bearing of the swivel arm defining the axis of rotation may also be guided differently, for example, by way of a rocker, a parallelogram or similar devices.

In a preferred embodiment, the swivel arm is vertically oriented in the center position and, for implementing a transport step, swivels out to both sides. In the center position, which may be considered the parking position, the sides of the sliding tables of the adjacent machining stations are free and therefore also accessible. This is advantageous for the exchange of tools. In addition, it is possible to arrange the drive device above the tables. The space below and between the tables therefore remains free for waste chutes and scrap metal conveyer belts.

The drive device can be disposed on the press stands, which permits an extremely space-saving construction and avoids problems of a separating point between the press stands and the tables.

The lever mechanism, which includes the swivel arm, can have different constructions. It may, for example, have a guide rod which is connected at a connection point in an articulated manner with the swivel arm and which is connected with a rotary drive. If the rotary drive is held, for example, on a slide block displaceably disposed on a guide, which slide block itself is connected with a stationary drive device, a targeted controlling of the slide block drive and of the rotary drive allows a desired curve of the carrier device to be driven.

In a preferred embodiment, the slide block is disposed in a vertical guide. The guide rod is applied approximately in the center to the swivel arm, whose end away from the carrier device is, in turn, swivellably disposed on a slide block whose linear guide is aligned in parallel to the former guide. In this embodiment, very clear controlling and driving conditions are obtained, particularly if the length of the guide rod corresponds to half the length of the swivel arm, which is defined by the distance of the devices or the tilting axis from the swivelling axis of the swivel arm, and if, in addition, the guide rod is applied in the center to the swivel arm. In this case, a control of the slide block drive causes only a vertical adjustment of the carrier device, and a control of the swivel drive causes only a linear adjustment of the carrier device in the transport direction.

Alternatively, the swivel arm can be driven by two mutually interacting guide rods which are arranged at an acute angle with respect to one another and which are fastened on the swivel arm by an articulation which defines, for both guide rods, a coinciding or joint axis of articulation. On their other ends, the guide rods are preferably suspended in an articulated manner on slide blocks of a linear guide which are provided with linear drives. The guides may be provided vertically at the press stands and have a vertical guiding device. A compact construction is obtained, in which the transport movement of the carrier device is achieved without the requirement of providing force transmission devices extending in the transport direction. Because of the step-up by the swivel arm, the linear strokes to be travelled by the slide blocks are relatively short, so that a compact space-saving construction is achieved.

As required, the guide rods and/or swivel arms can be constructed in a longitudinally adjustable manner. This can provide additional degrees of freedom when guiding the carrier device.

The drive device is preferably connected with a force generating device which, by way of the lever mechanism of the drive device, guides a compensation force to the carrier device which at least approximately compensates the weight of the carrier device and of the connected lever mechanism. The force generating device can be applied by rotatingly driven guide rods to its slide blocks. In addition, the rotary drive can be force-compensated. For this purpose, the guide rod can be acted upon, at a point between its swivelling axis and the axis of articulation, by means of a more or less constant force which is directed essentially vertically upwards or, on the other side of the swivelling axis, is directed downward. This may take place by pneumatic cylinders.

In the embodiment with two guide rods arranged at an acute angle with respect to one another, for operating the swivel arm, the weight compensation can take place by way of a third guide rod which is applied to the swivel arm by an essentially identical hinge axis and extends to another vertical slide block. This vertical slide block is connected by a linkage with a force generator, such as a pneumatic cylinder, which guides a largely constant, vertically upward-directed force onto the slide block.

BRIEF DESCRIPTION OF THE DRAWINGS

Other objects, advantages and novel features of the present invention will become apparent from the following detailed description of the invention when considered in conjunction with the accompanying drawings.

FIG. 2 is a perspective view at a different scale of two working stations of the press working line according to FIG. 1 and of the transfer unit arranged in-between;

DETAILED DESCRIPTION OF THE DRAWINGS

Figure 1:
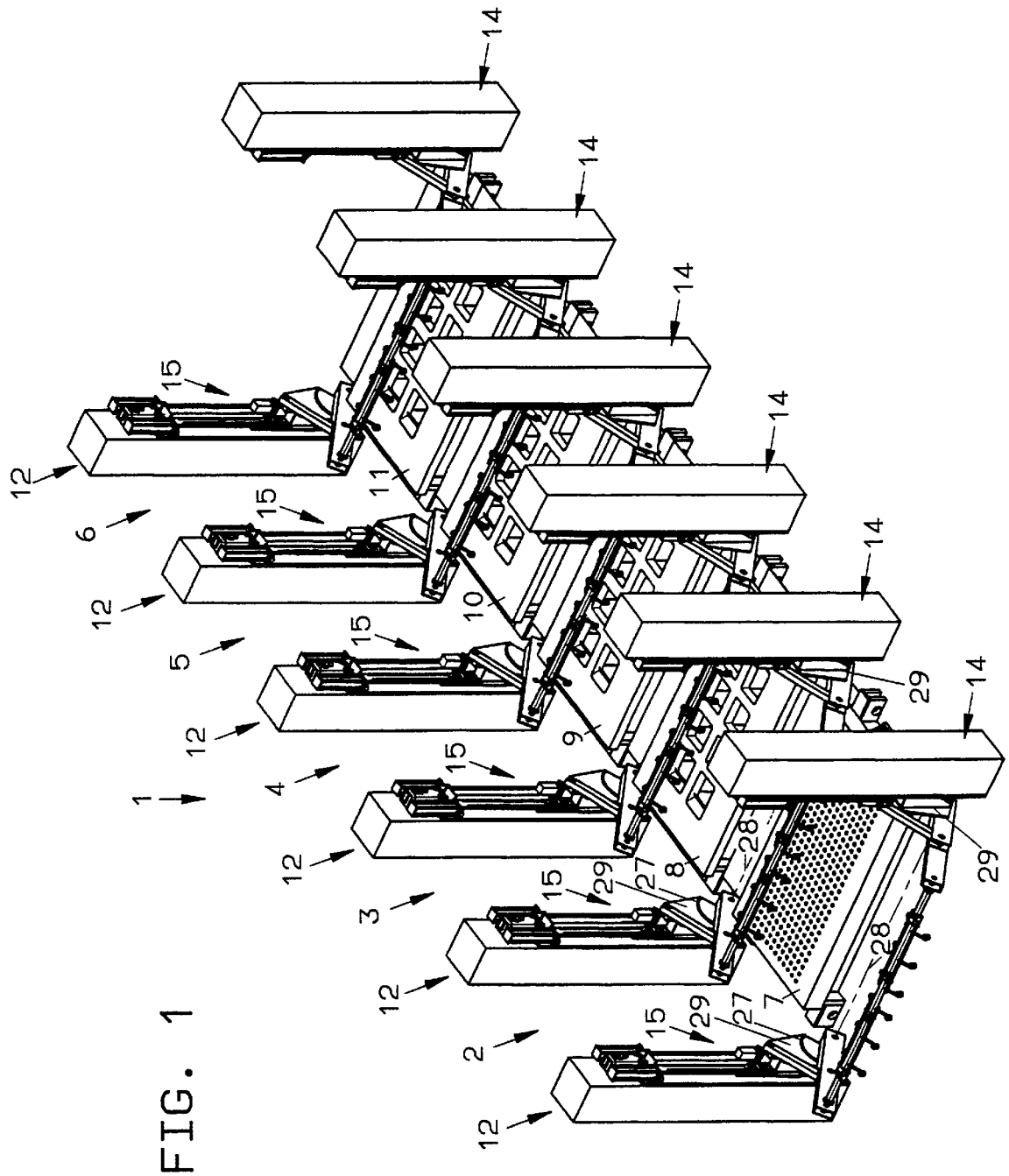
FIG. 1 is a cutout-type perspective schematic diagram of a press working line having several working stations which are linked with one another by transfer units.

FIG. 1 illustrates a press working line 1 with several successive working stations 2, 3, 4, 5, 6 for machining workpieces. Each working station 2 to 6 includes one sliding table 7, 8, 9, 10, 11 respectively which is used for receiving a conventional tool. On both sides of the row formed by the sliding tables 7, 8, 9, 10, 11, press stands 12, 14 positioned to fill gaps with the sliding tables 7, 8, 9, 10, 11.

In order to permit the transport of workpieces from one working station to another, transfer units 15 are each arranged between two successive working stations as well as at the start and at the end of the row formed of the working stations 7 to 11. The transfer units 15 have mutually identical constructions and are therefore provided with the same reference number.

Figure 2:
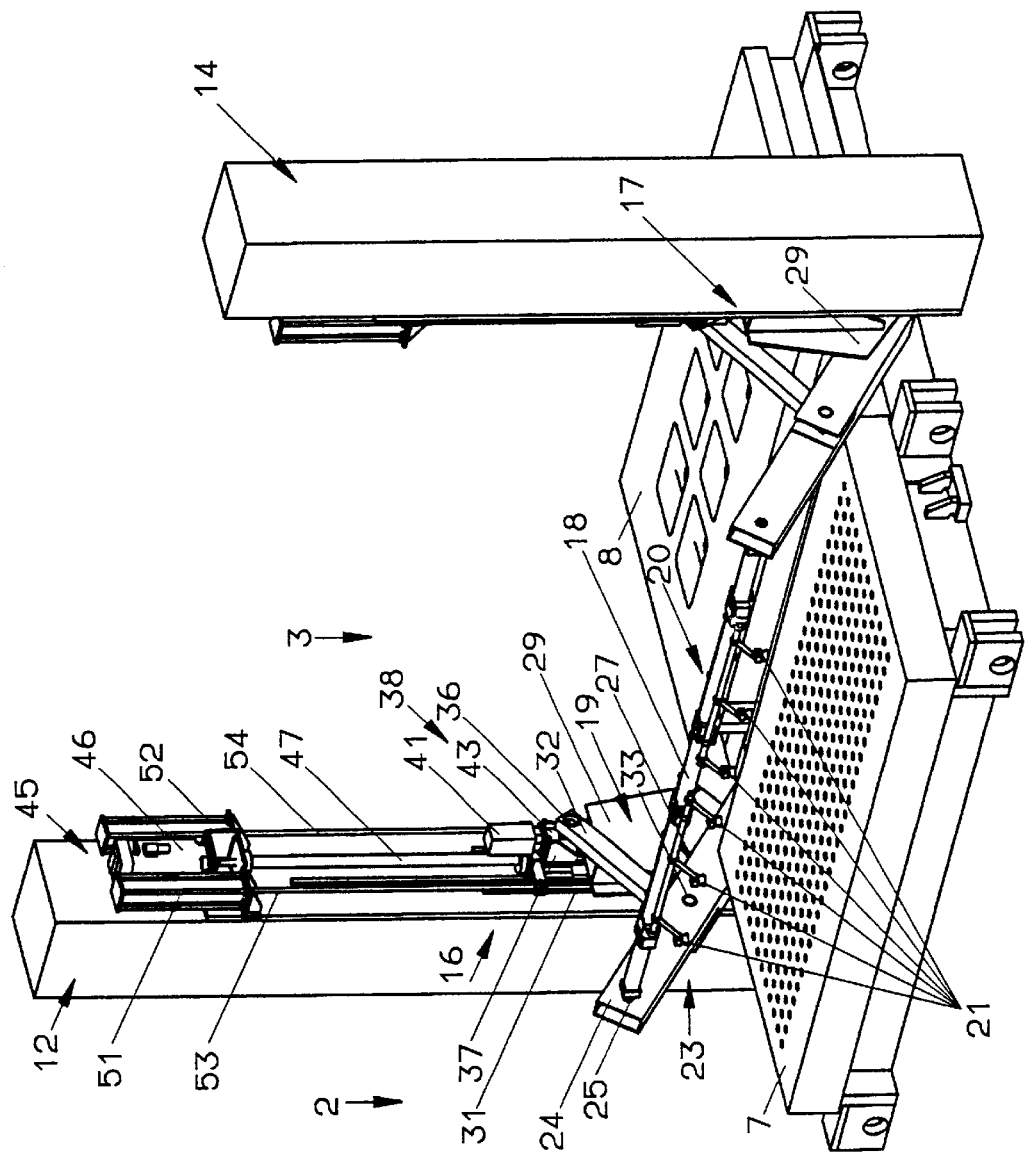

The transfer unit 15 arranged between the working stations 2, 3 (and thus between the sliding tables 7, 8) is illustrated separately in FIG. 2, and will be described in the following as representative of all other transfer units 15 of the press working line 1.

The transfer unit 15 has two drive devices 16, 17 which are constructed mirror-symmetrically to one another with respect to a vertical plane and hold a traverse 18 between one another which is used as a carrier device for workpieces. For receiving or gripping or holding the workpieces, such as large-surface sheet metal pieces, for example, if the transfer press 1 is a vehicle body press, suction spiders 19, 20 are arranged on the traverses, which suction spiders 19, 20 each have several mutually spaced suction devices 21. Because of the mirror symmetry between the drive devices 16, 17, the description of the drive device 16 applies correspondingly to the drive device 17, so that the same reference numbers are used.

The drive device 16 includes a lever mechanism 23 having a swivel arm 24 which, at one end, has a receiving device 25 for the traverse 18. The receiving device 25 forms the output of the lever mechanism 23 and disposes the traverse 18 rotatably about an axis (the so-called tilting axis) aligned transversely to the transport direction.

Figure 3:
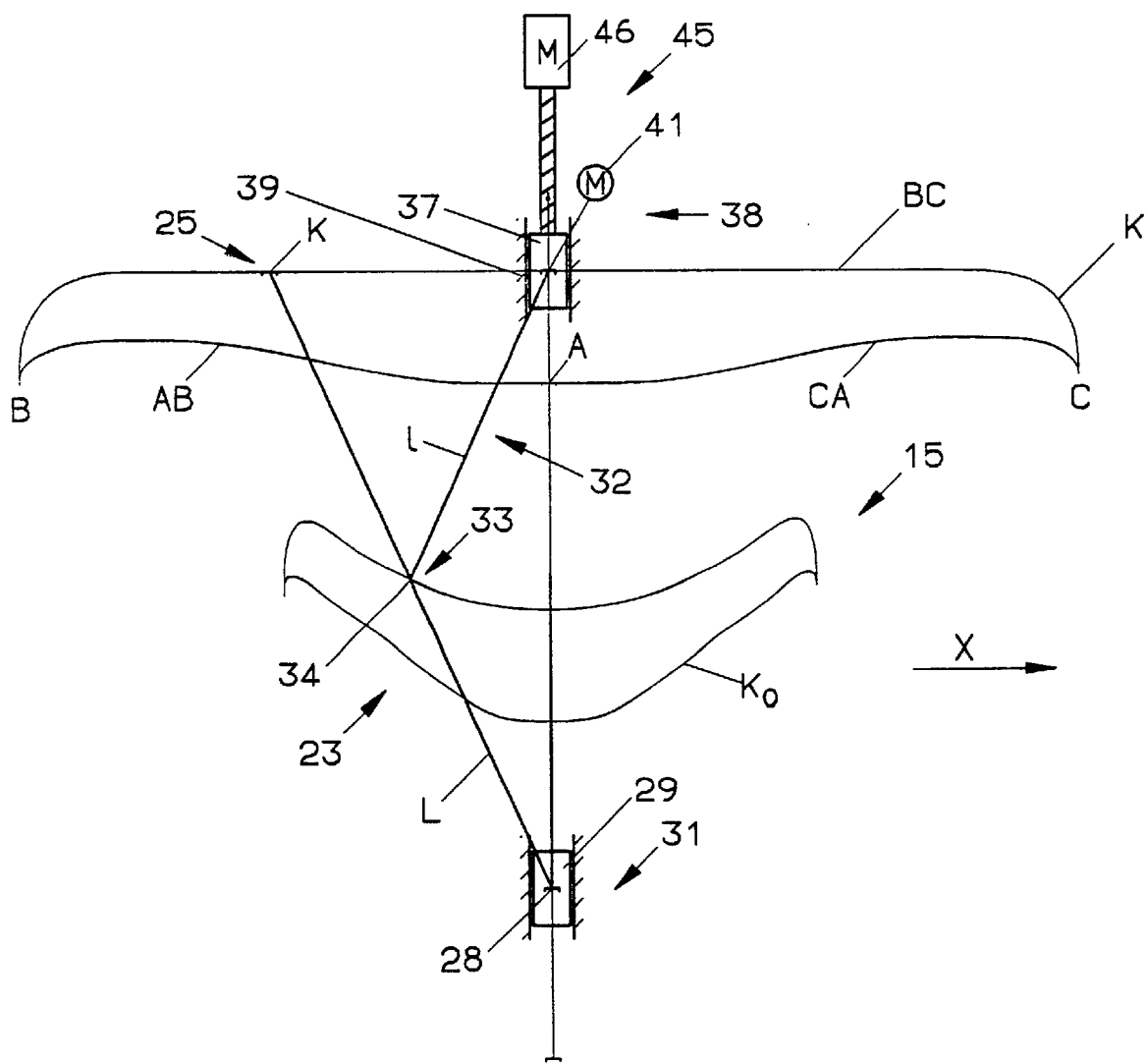
FIG. 3 is a schematic diagram of the kinematics of the transfer unit according to FIG. 2.

The swivel arm 24 is disposed on a slide block 29 by way of a guide 27 which defines a swivelling axis 28. The swivelling axis 28 and a tilting axis K formed by the central axis of the guide 25 or of the traverse 18 determines the length of the swivel arm 24, which in FIG. 3 is designated by the letter L. The slide block 29 can be replaced by a driven or passive guide rod guiding device which represents a curved guide instead of the linear guide.

The slide block 29 is vertically adjustably disposed in a linear guide 31. The slide block 29 travels freely; i.e., it is not connected with a drive and is freely movable in the vertical direction. The swivel arm 24 can be swivelled freely on the slide block 29. Thus, no drive devices exist at the level of the sliding tables 7, 8 and below these tables. As required, a swivel motor may be provided for swivelling the traverses.

The drive of the swivel arm 24 takes place by way of a guide rod 32, whose length 1 amounts to half the length L of the swivel arm 24. The guide rod 32 is swivellably connected with the swivel arm 24 at an articulation 33 having an articulation axis 34 which is situated in the center between the tilting axis K and the swivelling axis 28.

The other end of the guide rod 32 away from the swivel arm 24, 32 is connected with a shaft end 36 which is the output of a swivel drive 38 disposed on a linear slide block 37. The slide block 37 is guided in the vertical direction by a slide block guide 39. The slide block guide 39 is arranged in parallel to the slide block guide 31 and, like it, is arranged at the press stand 12 or 14. The swivel drive 38 carried by the slide block 37 is formed by a servo motor 41 and a reduction gear 43 whose output is the shaft end 36. The slide block 37 is connected with a stroke drive 45 which includes a servo motor 46 and a spindle stroke mechanism 47 arranged behind it. Both motors 41, 46 are controlled by a central control device.

For compensating the weight applied to the traverse 18 as well as the weight of the lever mechanism consisting of the swivel arm 24 and of the guide rod 32, a force generating device is provided and has, for example, two pneumatic cylinders 51, 52. The internal pressure of the cylinders 51, 52 is either essentially constant and/or optionally controlled by the control device. The pneumatic cylinders 51, 52 are connected by tie bars 53, 54 with the slide block 37.

As illustrated schematically in FIG. 3, the transfer unit 15 described so far operates as follows. The control unit causes the servo motors 41, 46 to lift and lower the slide block 37 such that the articulation axis 34 travels along the transfer curve $K_0$ illustrated in an exaggerated manner in FIG. 3. The articulation 33 forms the drive for the swivel arm 24. Its lower end is supported on the slide block 29 which therefore forms the bearing for the swivel arm 24. Because of the lever transmission from the drive at the articulation 33 to the receiving device 25, the desired loop-shaped transfer curve K is formed at the receiving device 25 and thus at the carrier device 18.

In the transfer direction X, the transfer curve K has a length which is twice as large as the length of the curve $K_0$ in the transfer direction. The height of both curves is approximately the same. The swivel arm 24 therefore carries out a step-up.

That is, the carrier device 18 moves considerably faster and is accelerated more and braked more than the articulation 33. The fast transfer movement is achieved by relatively slow swivelling motions at the guide rod 32 and relatively slow lifting and lowering movements of the slide block 37. The inert masses of these elements therefore impair the acceleration and the braking of the carrier device 18 by means of reduced values.

Good driving dynamics can therefore be achieved, in which the introduced drive device 16 also permits good positioning precision. At the measurement ratios (L=2*1) illustrated in FIG. 3, the vertical direction and the transport direction X are uncoupled; i.e., a movement of the motor 41 is converted only into an X-movement, and a movement of the motor 46 is converted only into a pure Y-movement.

In the inoperative position and at the start of the working play of the transfer unit 15, the swivel arm 24 is swivelled by the guide rod 32 into the vertical position. The tilting axis K is in a first point A of the transfer curve K. While the tool of the machining station 2 situated in front in the transport direction X opens up, the swivel drive 38 is operated in that the motor 41 is controlled such that guide rod 32 swivels to the left in FIG. 3, i.e., against the transport direction X. As a result of the control of the motor 46, the slide block 37 simultaneously carries out a lifting-lowering movement. Thereby, starting out from the path point A, the carrier device 18 travels by way of its tilting axis K through the curve section B and arrives in an almost vertical lowering movement at the receiving point B. By operating the suction device 21, the workpiece is received here; whereupon, first, the motor 45 is controlled in order to lift the workpiece.

As soon as the stroke has started, the motor 41 is controlled against its original direction, whereby the carrier device 18 is considerably accelerated in the transport direction X and travels through the curve route BC to the depositing point C. Shortly before the depositing point C is reached, the slide block 37 is lowered again and the rotary drive 38 brakes the continued movement. When the workpiece is deposited in path point C in the tool of the subsequent machining station 3, the swivel drive 38 and the stroke drive 45 are controlled such that the carrier device 18 travels back on the path curve CA to the starting point A. Here, the carrier device 18 is situated completely between the machining stations 2, 3, and the machining of the workpiece can now take place.

Deviating from the above-described embodiment, the guide rod 32 can also be fastened on a stationarily disposed swivel drive. The vertical adjustment can then be achieved, for example, by a telescopic drive of the guide rod 32, which will then be constructed in a longitudinally adjustable manner. As an alternative, in the embodiment having the slide block 37 as well as in the embodiment having the linking of the guide rod 32 on a stationary swivelling shaft, the swivel drive can be arranged at the articulation 33. The swivel arm will then, however, be subjected to larger movements and accelerations.

As required, a swivel drive can also be arranged on the slide block 29 and can act directly onto the swivel arm 24. This can take place if the guide rod 32 cannot be changed in its length and is disposed on a slide block 37 as well as when the guide rod 32 is constructed as a telescope and its linking point is defined by a swivelling axis fixed in space.

Irrespective of how the swivel drive of the swivel arm 24 is implemented in detail, the swivel arm 24 can also be constructed in a telescoping manner. The telescopable point can be arranged to be above as well as below the articulation 33 and can be provided with a telescope drive. Here, it is possible to eliminate the lower slide block 29. This construction can lead to a reduced height and this can also have advantages.

Figure 6:
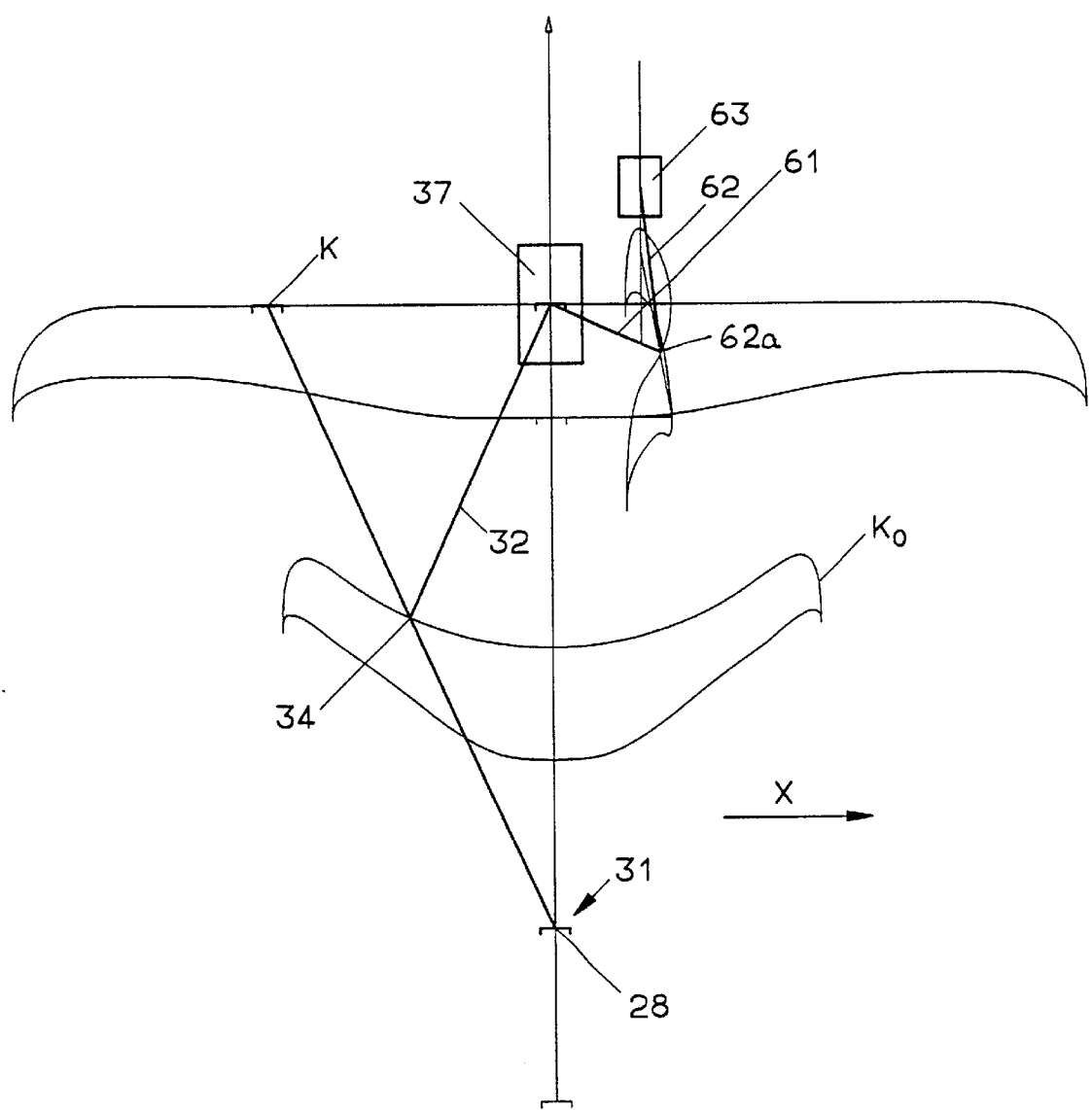
FIG. 6 is a diagram of the kinematics of a transfer unit according to the principle illustrated in FIG. 2 with a modified embodiment of a swivel drive.

An embodiment of the drive device 16 which is modified further is indicated by the kinematics illustrated in FIG. 6.

Instead of the swivel drive 38 carried by the slide block 37, the guide rod 32 is provided with a lever arm 61 fixedly connected therewith, which is connected with a slide block 63 by way of a connecting rod 62. This slide block 63 is guided in a linear guide which is preferably aligned parallel to the linear guide of the slide block 37. A drive of the slide block 63 causes a swivelling of the guide rod 32, as soon as the latter is not controlled synchronously with the drive of the slide block 37.

Figure 8:
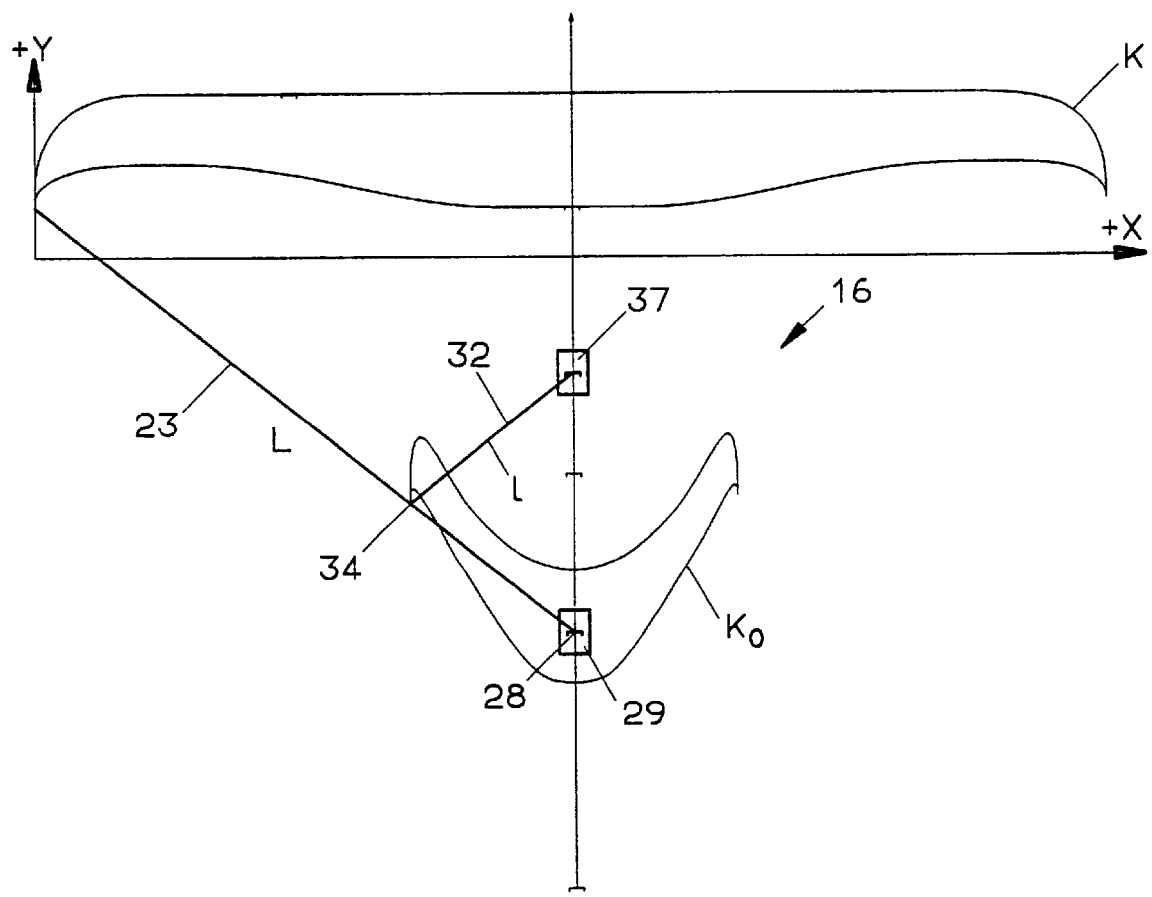
FIG. 8 is a diagram of the kinematics of a modified transfer unit.

FIG. 8 illustrates an embodiment of the drive unit 16, in which the length ratios between the swivel arm 24 and the guide rod 32 are different than the ratios described so far. The length L of the swivel arm 24 exceeds by more than twice the length l of the guide rod 32. This results in a larger step-up. The guides and drives can be constructed and arranged according to all the above-explained variants and embodiments. In addition, it is within the scope of the present invention, in the case of all embodiments, to arrange the drive device 16 is a virtually suspended manner; i.e., in FIG. 8, upside-down. This may be significant when all drives and guides are to be arranged as far as possible above the sliding tables 7, 8. In the suspended mounting, irrespective of whether the slide block 37 is driven and the slide block 29 moves freely, (or whether the slide block 29 is driven and the slide block 37 moves freely), the drives of the slide blocks can be arranged above the lever mechanism. In addition, the slide blocks 37, 29 can be eliminated if the swivel arm 24 is constructed as a telescope and the distance between the articulation axis 34 and the swivelling axis 28 is therefore variable.

Figure 4:
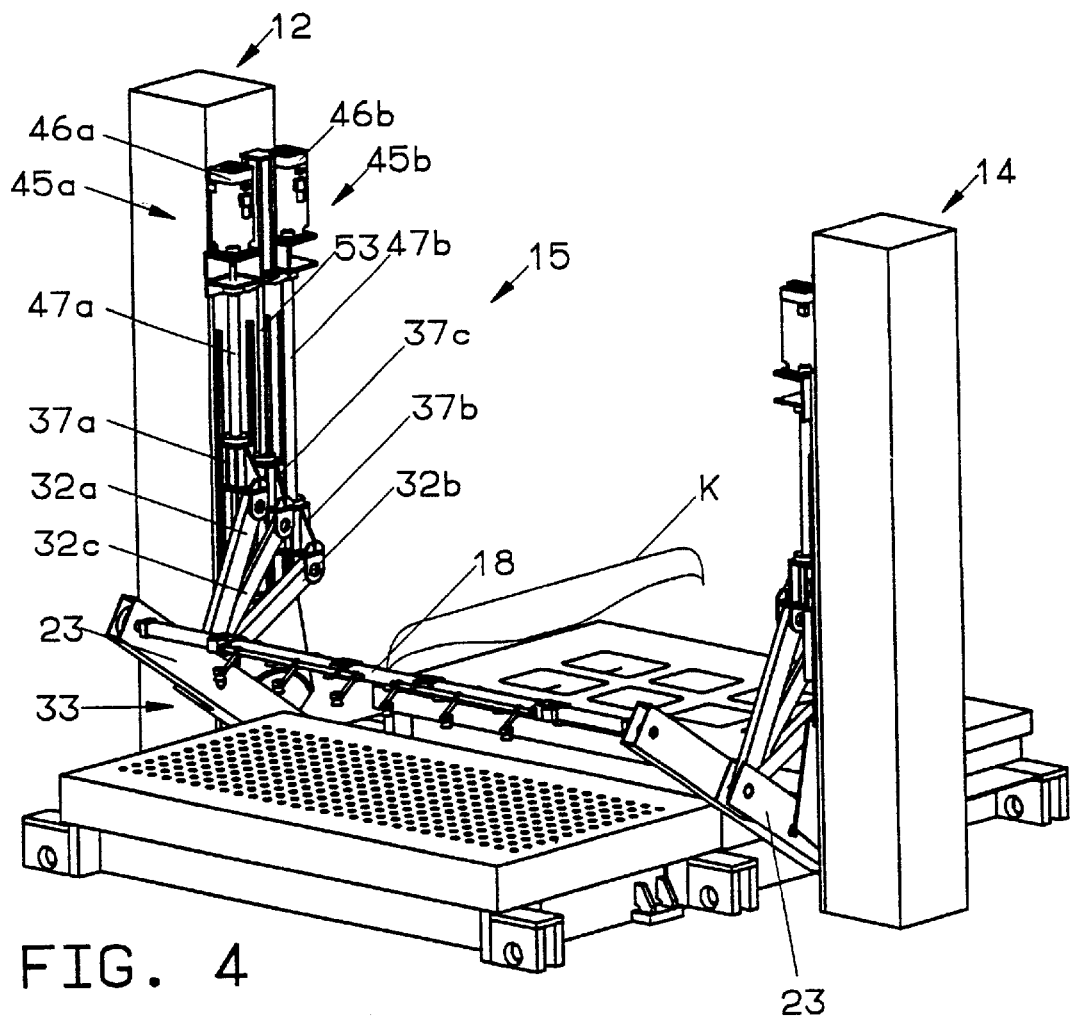
FIG. 4 is a perspective view of a modified embodiment of a transfer unit for linking two working stations.
Figure 5:
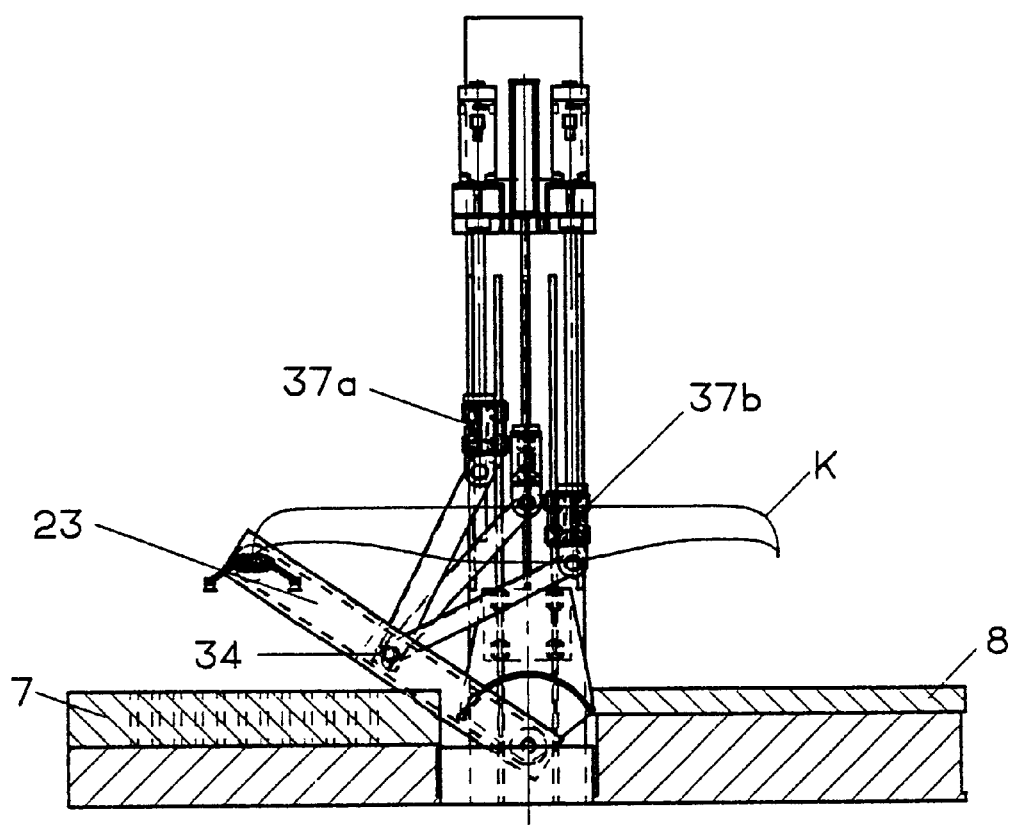
FIG. 5 is a schematic side view of the working stations and the transfer unit according to FIG. 4.

Another embodiment of the transport and positioning unit 16 is illustrated in FIGS. 4 and 5. The construction and bearing of the swivel arm 24 and of the traverse 18 carried by the swivel arm 24 coincides with the embodiment according to FIG. 2. The transfer unit 15 according to FIG. 4 differs, however, from the above-described transfer unit by the positioning of the swivelling axis 34 in the space. Two guide rods 32a, 32b are used for this purpose which are linked at the articulation 33 to the swivel arm 24. The two guide rods 32a, 32b have the same hinge axis 34.

The guide rods 32a, 32b extend at an acute angle with respect to one another away from the swivel arm 24 to the slide blocks 37a, 37b which are disposed parallel to one another, for example, on parallel linear guides on the press stand 12 (14). The guide rods 32a, 32b, which are constructed, for example of the same length, are freely swivellably disposed on the slide blocks 37a, 37b. The slide blocks 37a, 37b are each connected with a stroke drive 45a, 45b. These include servo motors 46a, 46b which, by way of linear transmissions, such as spindle stroke mechanisms 47a, 47b, act upon the slide blocks 37a, 37b.

A third guide rod 32c, which is also applied to the articulation 33 or in proximity thereto, leads to a third slide block 37c which is acted upon, for example, by an essentially constant, vertically upward-directed force and is disposed on a vertical guide. For generating the force, the pneumatic cylinder 51 is used which is set up as a force generator and which is connected with the slide block 37c by way of the tie bar 53.

In this embodiment of the transfer unit 15, the transfer curve $K_0$ is achieved on the articulation axis 34 by the interaction of the stroke movement of the slide blocks 37a, 37b. As in the above-described embodiments, the swivel arm 24 converts the movement of the articulation axis 34 into the transfer curve K.

Figure 7:
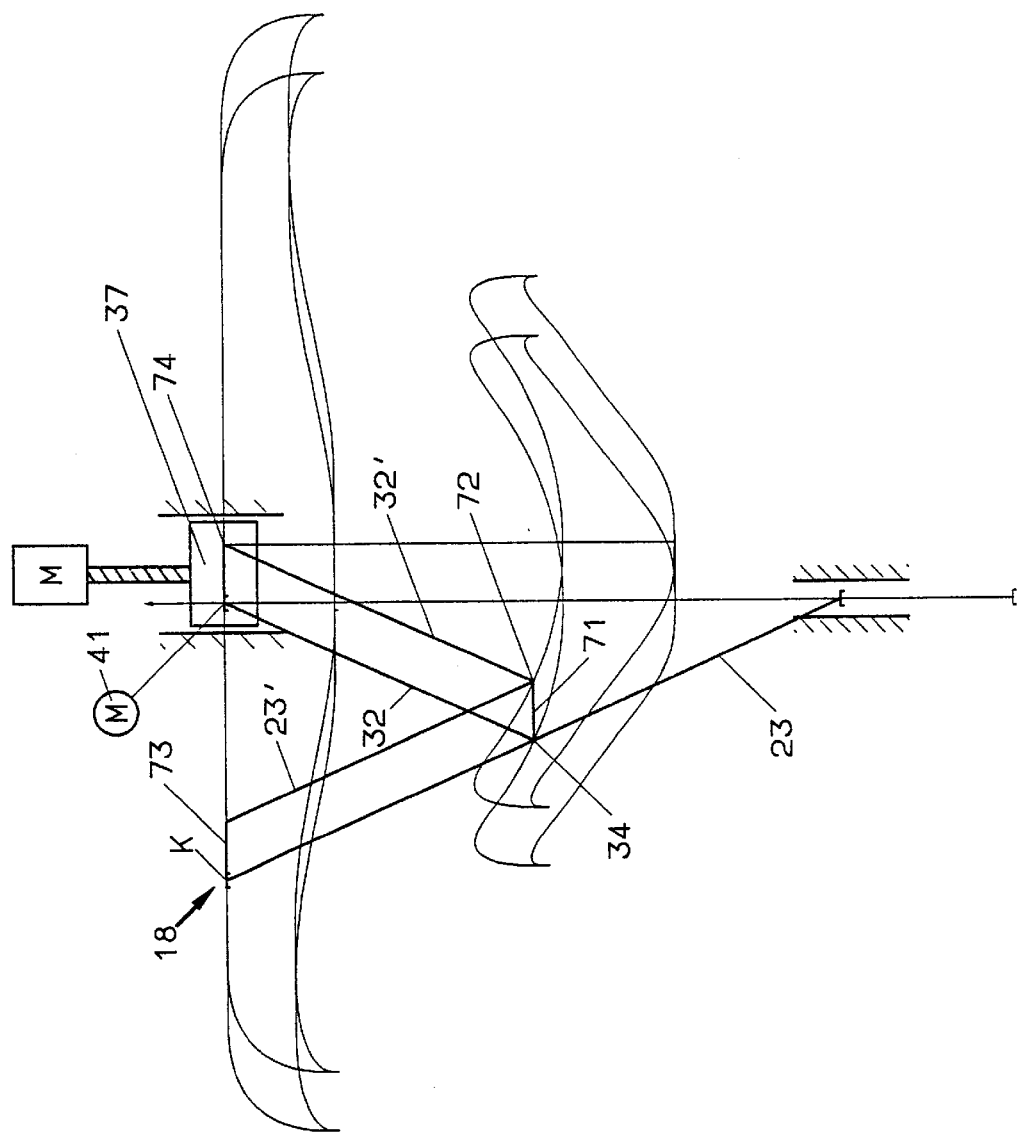
FIG. 7 is a diagram of the kinematics of a transfer unit having a parallelogram guide for receiving workpieces.

In all the above-described embodiments, the traverse 18 can be guided in an untilted manner and swivelling or tilting of the traverse 18 can be achieved in a targeted manner. FIG. 7 illustrates kinematics in which, starting from the slide block 37, a parallelogram guide leads to the traverse 18. In parallel to the guide rod 32, a guide rod 32' is provided which is swivellably disposed on the slide block 37. A short guide lever 71 is linked to the swivel arm 24 swivellably about the articulation axis 34. The guide level 71 extends parallel to the imaginary connection of the opposite swivelling axes of the guide rods 32, 32'. The guide rod 32', whose length coincides with the length of the guide rod 32, is swivellably connected with the guide lever 71 at an axis 72. The guide rods 32, 32' form a parallelogram. This also applies to the section of the swivel arm 24, which extends from the articulation axis 34 to the tilting axis K, and to another guide rod 23' which leads from the guide lever 71 to a lever 73 which is connected with the traverse 18. In this case, the lever 72 is as long as the guide lever 71.

In this embodiment, the tilted position of the traverse 18 is defined by the alignment of the lever 73 which, in every swivelling position coincides with the alignment of the connection line between the upper end of the guide rods 32, 32'. In order to achieve a targeted tilting of the traverse 18, the guide rod 32' can be connected to the slide block at a linking point 74 which is vertically adjustable with respect to the slide block 37. A corresponding adjusting drive can be carried by the slide block 37. In addition, the guide rod 32' and/or the guide rod 24' can be constructed in a longitudinally adjustable manner.

In summary, a transport and position system 15, particularly for the workpiece transfer, has a lever mechanism between its driving motors 41, 46 and its output 18, which lever mechanism 23 carries out a step-up. The lever mechanism 23 takes over the guiding as well as the driving of the carrier device 18 which therefore forms the output of the lever mechanism. As the result of the step-up, high accelerations and decelerations can be achieved at the carrier device 18, in the case of which the mass inertia of used linear guides for the bearing of levers and mass inertias of drives moved along play a clearly reduced role. On the other hand, a high positioning precision can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A transport or positioning system for the transfer or positioning of workpieces, comprising:

a drive having at least one lever mechanism with an output for driving and positioning a carrier device, wherein the lever mechanism includes a swivel arm with one end thereof forming the output and being connected with the carrier device, and being connected at two mutually spaced connection points defining a bearing point and with a, driving point and a distance between the bearing point and the driving point being smaller than a distance between the output and the bearing point.

2. The system according to claim 1, wherein the swivel arm is operatively guided such that the output travels through a loop-shaped path which travels through a path longer than a path travelled by one of the bearing point and the driving point.

3. The system according to claim 2, wherein the loop-shaped path (K) is oriented a vertical plane.

4. The system according to claim 1, wherein the swivel arm is swivellably arranged about a horizontal axis disposed on the bearing.

5. The system according to claim 1, wherein the bearing of the swivel arm is guided on a defined path.

6. The system according to claim 1, wherein the connection point which connects the drive of the swivel arm with the swivel arm is arranged between the bearing and the output.

7. The system according to claim 1, wherein the drive is constructed and guided such that the swiveling position of the connection point of the drive with the swivel arm is defined by the drive.

8. The system according to claim 1, wherein the drive has at least one guide rod for connecting the swivel arm with a guiding device.

9. The system according to claim 8, wherein the guiding device is a linear guiding device connected with a drive unit.

10. The system according to claim 8, wherein the guiding device is a slide block guiding device on which the guide rod is swivellably disposed.

11. The system according to claim 10, wherein the guide rod is connected with a swivel drive for defining the swivelling position of the guide rod.

12. The system according to claim 11, wherein the swivel drive is carried by the slide block.

13. The system according to claim 11, wherein the swivel drive is arranged outside the slide block.

14. The system according to claim 1, wherein the connection point is arranged between the guide rod and the swivel arm in the center between the bearing and the output.

15. The system according to claim 13, wherein the swivel drive is connected at a point spaced away from a rotation axis of the guide rod with the guide rod, the swivel drive having a guiding device with a guiding direction, aligned parallel to the guiding device of the guide rod, and the guide rod being a two-armed lever having one end which guides the swivel arm and another end which is connected with the swivel drive.

16. The system according to claim 1, wherein the drive has at least two guide rods for connecting the swivel arm with guiding devices, enclosing an acute angle with one another and being connected at a point swivellably arranged about a common swivelling axis with the swivel arm.

17. The system according to claim 16, wherein the guiding devices are each connected with a drive unit, the guiding devices being slide block guides having slide blocks on which the guide rods are arranged to be freely swivellably disposed.

18. The system according to claim 17, wherein the guiding devices are mutually parallel linear guides.

19. The system according to claim 1, wherein at least one of the swivel arm and the guide rod have a telescopable construction and are provided with a telescope drive.

20. The system according to claim 1, wherein the the swivel arm is provided with a device for tilt alignment of the carrier device.

21. The system according to claim 1, wherein the swivel arm has a stationary belt pulley connected via a toothed belt with a belt pulley of the same size as the stationary belt pulley, the second-mentioned belt pulley being fixedly connected with the carrier device to prevent tilting of the carrier device about a horizontal axis transversely to the transport direction (T).

22. The system according to claim 21, wherein the belt pulley is situated on the swivel arm 24 at the connection point.

23. The system according to claim 21, wherein the belt pulley on the swivel arm is not fixedly connected with the swivel arm, and is driven by a motor for targeted tilting of the carrier device.

24. The system according to claim 22, wherein the belt pulley on the swivel arm is not fixedly connected with the swivel arm, and is driven by a motor for targeted tilting of the carrier device.

25. The system according to claim 8, wherein at least one of the swivel arm and the guide rod have a telescopable construction and are provided with a telescope drive.

\* \* \* \* \*